United States Patent
Jeong et al.

(10) Patent No.: US 10,128,521 B2
(45) Date of Patent: Nov. 13, 2018

(54) HEAT TREATMENT DEVICE OF MEMBRANE-ELECTRODE ASSEMBLY (MEA) FOR FUEL CELL

(71) Applicant: HYUNDAI MOTOR COMPANY, Seoul (KR)

(72) Inventors: Sung Hoon Jeong, Anyang-si (KR); Jong Cheol Ahn, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 432 days.

(21) Appl. No.: 14/947,435

(22) Filed: Nov. 20, 2015

(65) Prior Publication Data
US 2017/0069926 A1    Mar. 9, 2017

(30) Foreign Application Priority Data
Sep. 3, 2015  (KR) .................. 10-2015-0125024

(51) Int. Cl.
| | |
|---|---|
| *B32B 37/00* | (2006.01) |
| *H01M 8/1004* | (2016.01) |
| *H01M 8/0286* | (2016.01) |
| *H01M 8/0273* | (2016.01) |
| *H01M 8/1018* | (2016.01) |

(52) U.S. Cl.
CPC ....... *H01M 8/1004* (2013.01); *H01M 8/0273* (2013.01); *H01M 8/0286* (2013.01); *H01M 2008/1095* (2013.01)

(58) Field of Classification Search
CPC . H01M 8/1004; H01M 8/0273; H01M 8/0286
USPC ............................................. 156/580, 583.1
See application file for complete search history.

(56) References Cited

U.S. PATENT DOCUMENTS

| | | | |
|---|---|---|---|
| 6,500,217 B1 * | 12/2002 | Starz .................. | B41M 1/26 |
| | | | 29/623.5 |
| 7,681,304 B2 | 3/2010 | Brown et al. | |
| 2007/0116999 A1 * | 5/2007 | Kuramochi ........... | B32B 37/223 |
| | | | 429/469 |

FOREIGN PATENT DOCUMENTS

| | | |
|---|---|---|
| JP | 2010-212002 A | 9/2010 |
| KR | 10-2009-0043765 A | 5/2009 |
| KR | 10-2012-0125797 A | 11/2012 |
| KR | 10-2015-0079461 A | 7/2015 |

* cited by examiner

*Primary Examiner* — James D Sells
(74) *Attorney, Agent, or Firm* — McDermott Will & Emery LLP (57) ABSTRACT

A heat treatment device of a membrane-electrode assembly for a fuel cell for heat-treating a membrane-electrode assembly sheet includes an electrolyte membrane and electrode catalyst layers continuously adhered onto both surfaces of the electrolyte membrane, the heat treatment device of a membrane-electrode assembly for a fuel cell including: i) a feeding roller feeding the membrane-electrode assembly sheet along a predetermined transport path; and ii) hot presses disposed on upper and lower sides of the transport path, respectively, installed to be reciprocally movable in a vertical direction, and pressing portions of the electrode catalyst layers of upper and lower surfaces of the membrane-electrode assembly sheet at a predetermined temperature.

15 Claims, 11 Drawing Sheets

HEAT TREATMENT DEVICE OF MEMBRANE-ELECTRODE ASSEMBLY (MEA) FOR FUEL CELL

CROSS-REFERENCE TO RELATED APPLICATION

This application claims the benefit priority to of Korean Patent Application No. 10-2015-0125024, filed in the Korean Intellectual Property Office on Sep. 3, 2015, the entire contents of which are incorporated herein by reference.

BACKGROUND (a) Field

The present invention relates generally to a manufacturing system of a membrane-electrode assembly (MEA) for a fuel cell, and particularly to a heat treatment device of a membrane-electrode assembly for a fuel cell for heat treating a membrane-electrode assembly.

(b) Description of the Related Art

As known in the art, a fuel cell produces electricity by an electrochemical reaction of hydrogen and oxygen. The fuel cell is characterized by being continuously developed due to a chemical reactant supplied from the outside without a separate charging process.

The fuel cell may be configured by disposing separators (separating plates or bipolar plates) at both sides thereof with a membrane-electrode assembly (MEA) interposed therebetween.

The membrane-electrode assembly forms an anode layer and a cathode layer as electrode catalyst layers at both sides thereof, based on an electrolyte membrane in which hydrogen ions move. In addition, the membrane-electrode assembly includes sub-gaskets protecting the electrode catalyst layers and the membrane, and securing assembly of the fuel cell.

According to a method of manufacturing the membrane-electrode assembly as described above, an electrode membrane sheet is manufactured by releasing a membrane wound in a roll form, releasing a release film wound in a roll form made by continuously coating the electrode catalyst layers, and passing the electrolyte membrane and the release film through a roll press so that the electrode catalyst layers are adhered under high temperature and high pressure on both surfaces of the membrane.

In addition, a membrane-electrode assembly sheet is manufactured by releasing the sub-gaskets rolled in a roll form so as to be positioned on both surfaces of an electrode membrane sheet, and passing the sub-gaskets through a hot roller so that the sub-gaskets are adhered to edges of the electrode membrane sheet.

After these above-described processes are performed, the membrane-electrode assembly sheet wound in a roll form is allowed to be released, and to be cut in a unit form including the electrode catalyst layers, thereby completing manufacture of the membrane-electrode assembly.

However, since a continuous adhesion process of the electrode catalyst layers is possibly performed, and a process rate is fast in a process of manufacturing the electrode membrane sheet by adhering the electrode catalyst layers on both surfaces of the electrolyte membrane in a roll-press manner as described above, mass-production is easily made but interfacial adhesion force of the electrode catalyst layers and the electrolyte membrane is not sufficient.

Generally, in the membrane-electrode assembly, as adhesion of border portions between the electrode catalyst layers and the electrolyte membrane is improved, performance and durability become excellent. However, when separation occurs at the border portions of the electrode catalyst layers and the electrolyte membrane since the interfacial adhesion force between the electrode catalyst layers and the electrolyte membrane is not sufficient, performance and durability of the membrane-electrode assembly may be reduced.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a heat treatment device of a membrane-electrode assembly for a fuel cell having advantages of pressing and heat-treating the membrane-electrode assembly sheet at a high temperature by a hot press process.

In addition, the present invention has been made in an effort to provide the heat treatment device of a membrane-electrode assembly for a fuel cell capable of preventing contraction and serpentine deformation of the membrane-electrode assembly sheet due to heat in the hot press process.

An exemplary embodiment of the present invention provides a heat treatment device of a membrane-electrode assembly for a fuel cell for heat-treating a membrane-electrode assembly sheet including an electrolyte membrane and electrode catalyst layers continuously adhered onto both surfaces of the electrolyte membrane, the heat treatment device of a membrane-electrode assembly for a fuel cell including: i) a feeding roller feeding the membrane-electrode assembly sheet along a predetermined transport path; and ii) hot presses disposed on upper and lower sides of the transport path, respectively, installed to be reciprocally movable in a vertical direction, and pressing portions of the electrode catalyst layers of upper and lower surfaces of the membrane-electrode assembly sheet at a predetermined temperature.

The feeding roller may be coupled to feeding holes formed in the membrane-electrode assembly sheet through feeding protrusions.

The feeding protrusions may protrude at the same pitch as that of the feeding holes at both sides of the feeding roller, and may be fitted into the feeding holes, corresponding to the feeding holes spaced apart from each other at a predetermined distance in a transport direction at both edge portions of the membrane-electrode assembly sheet.

The hot presses may include moving frames disposed to face each other on the upper and lower surfaces of the membrane-electrode assembly sheet, and installed to be reciprocally movable in a vertical direction, and at least one hot plate installed at the moving frames at a predetermined interval in the transport direction of the membrane-electrode assembly sheet, and pressing portions of the electrode catalyst layer of upper and lower surfaces of the membrane-electrode assembly sheet.

The moving frames may be installed to be connected with press cylinders for reciprocally moving the moving frames toward the upper and lower surfaces of the membrane-electrode assembly sheet.

The feeding roller may be rotatably installed to a side at which the membrane-electrode assembly sheet enters between the upper and lower hot presses.

The feeding protrusions may be formed into a hemisphere shape on both external circumference surfaces of the feeding roller.

Another embodiment of the present invention provides a heat treatment device of a membrane-electrode assembly for a fuel cell for heat-treating a membrane-electrode assembly sheet including an electrolyte membrane and electrode catalyst layers continuously adhered onto both surfaces of the electrolyte membrane, the heat treatment device of a membrane-electrode assembly for a fuel cell including: i) a feeding roller feeding the membrane-electrode assembly sheet along a predetermined transport path; ii) hot presses disposed on upper and lower sides of the transport path, respectively, installed to be reciprocally movable in a vertical direction, and pressing portions of the electrode catalyst layers of upper and lower surfaces of the membrane-electrode assembly sheet at a predetermined temperature; and iii) at least one feeding gripper installed to a gripping frame to be reciprocally movable in a transport direction of the membrane-electrode assembly sheet and performing gripping on both edge portions in the transport direction of the membrane-electrode assembly sheet.

The heat treatment device of a membrane-electrode assembly for a fuel cell may further include a gripper moving unit installed to the gripping frame so that the feeding grippers are reciprocally moved in the transport direction of the membrane-electrode assembly sheet.

The gripper moving unit may include a servomotor installed in the gripping frame, a lead screw installed to be connected with the servomotor, a moving block coupled to the feeding gripper and engaged with the lead screw, and a guide block installed to be fixed to the gripping frame, and coupled with the moving block to be slidably movable in the transport direction of the membrane-electrode assembly sheet.

The feeding gripper may include a fixing gripping bar fixed to the moving block, and a movable gripping bar mounted to the moving block to be reciprocatingly movable in a vertical direction, corresponding to that of the fixing gripping bar.

The moving block may be installed with a gripping cylinder applying forward and reverse operation force in a direction vertical to that of the movable gripping bar.

Yet another embodiment of the present invention provides a heat treatment device of a membrane-electrode assembly for a fuel cell for heat-treating a membrane-electrode assembly sheet including an electrolyte membrane and electrode catalyst layers continuously adhered onto both surfaces of the electrolyte membrane, the heat treatment device of a membrane-electrode assembly for a fuel cell including: (i) a feeding roller feeding the membrane-electrode assembly sheet along a predetermined transport path; (ii) hot presses disposed on upper and lower sides of the transport path, respectively, reciprocally movable in a vertical direction and heat-pressing portions of the electrode catalyst layers of upper and lower surfaces of the membrane-electrode assembly sheet at a predetermined temperature; and (iii) at least one feeding gripper mounted to a gripping frame to be reciprocatingly movable in a transport direction of the membrane-electrode assembly sheet and performing gripping on both edge portions in the transport direction of the membrane-electrode assembly sheet, the feeding roller being coupled to feeding holes formed in the membrane-electrode assembly sheet through feeding protrusions.

The feeding protrusions may protrude at the same pitch as that of the feeding holes at both sides of the feeding roller, and may be fitted into the feeding holes, corresponding to the feeding holes spaced apart from each other at a predetermined distance in a transport direction at both edge portions of the membrane-electrode assembly sheet.

The hot presses may include moving frames disposed to face each other on the upper and lower surfaces of the membrane-electrode assembly sheet, and reciprocally movable in a vertical direction, and at least one hot plate mounted at the moving frames at a predetermined interval in the transport direction of the membrane-electrode assembly sheet, and pressing portions of the electrode catalyst layer of upper and lower surfaces of the membrane-electrode assembly sheet.

The moving frames may be connected with press cylinders for reciprocatingly moving the moving frames toward the upper and lower surfaces of the membrane-electrode assembly sheet.

The gripping frame may be provided with a gripper moving unit for reciprocally moving the feeding grippers in the transport direction of the membrane-electrode assembly sheet.

The gripper moving unit may include a servomotor installed to be fixed to the gripping frame, a lead screw installed to be connected with the servomotor, a moving block coupled to the feeding gripper and engaged with the lead screw, and guide block installed fixed to the gripping frame, and coupled with the moving block to be slidably movable in the transport direction of the membrane-electrode assembly sheet.

The feeding gripper may include a fixing gripping bar e fixed to the moving block, and a movable gripping bar mounted to the moving block to be reciprocally movable in a vertical direction, corresponding to that of the fixing gripping bar, a gripping cylinder installed in the moving block, and applying forward and reverse operation force in a vertical direction to the movable gripping bar.

In an exemplary embodiment of the present invention, the membrane-electrode assembly sheet may be heat-treated in a hot press manner pressing the membrane-electrode assembly sheet at a high temperature to improve interfacial adhesion force of the electrolyte membrane and the electrode catalyst layers of the membrane-electrode assembly sheet and prevent separation of border portions between the electrolyte membrane and the electrode catalyst layers, thereby increasing performance and durability of the membrane-electrode assembly and securing mass production thereof.

In an exemplary embodiment of the present invention, since contraction and serpentine deformation of the membrane-electrode assembly sheet due to heat in the hot press process may be prevented through the feeding roller and the feeding gripper, product quality and productivity of the membrane-electrode assembly may be improved.

BRIEF DESCRIPTION OF THE DRAWINGS

Exemplary embodiments of the present invention are described with reference to the accompanying drawings and thus the spirit of the present invention is not limited to the accompanying drawings.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Portions unrelated to the description will be omitted in order to obviously describe the present invention, and similar components will be denoted by the same reference numerals throughout the present specification.

Since sizes and thicknesses of the respective components were arbitrarily shown in the accompanying drawings for convenience of explanation, the present invention is not limited to contents shown in the accompanying drawings. In addition, thicknesses were exaggerated in order to obviously represent several portions and regions.

In addition, in the following description, terms 'first', 'second', and the like, will be used to distinguish components having the same names from each other, and will not be necessarily be limited to a sequence thereof.

Throughout the present specification, unless explicitly described to the contrary, the word "comprise" and variations such as "comprises" or "comprising", will be understood to imply the inclusion of stated elements but not the exclusion of any other elements.

Further, terms such as " . . . unit", " . . . means", " . . . part", " . . . member", and the like, described in the specification indicate units of a comprehensive configuration performing at least one function and operation.

Figure 1:
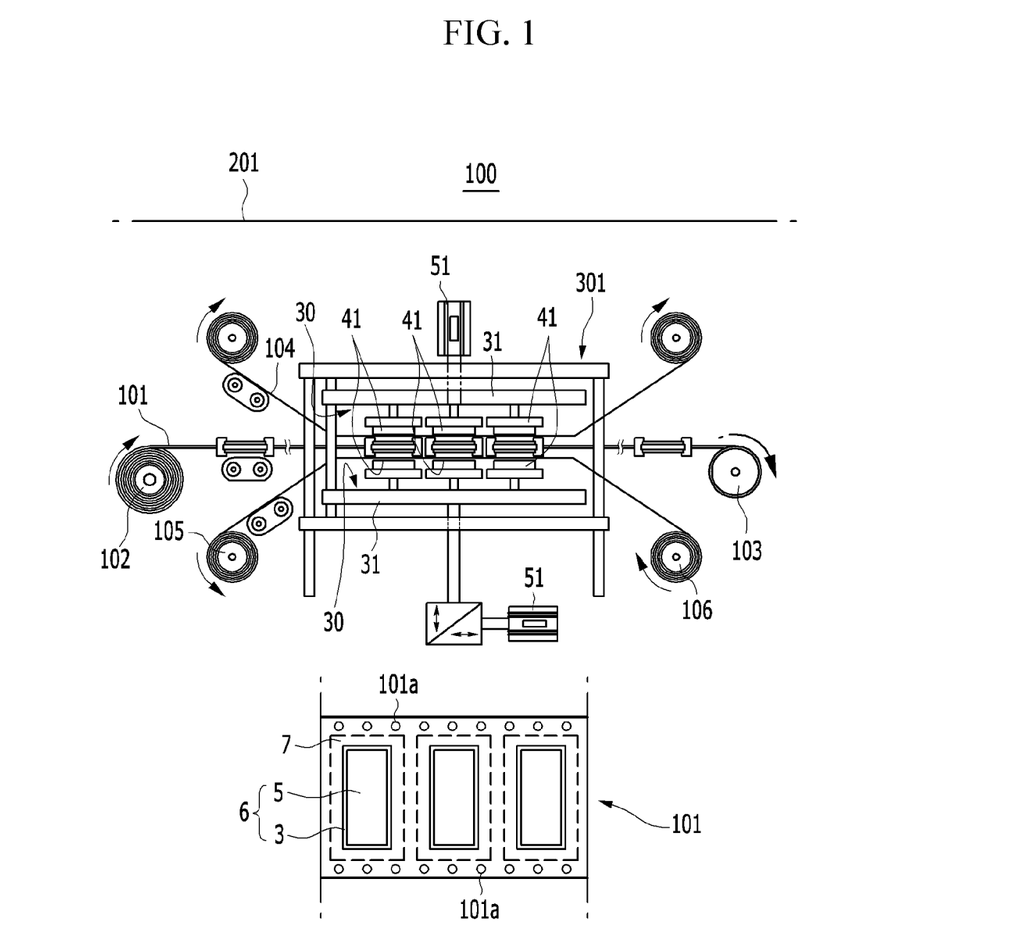
FIG. 1 is a schematic diagram schematically showing a heat treatment device of a membrane-electrode assembly for a fuel cell according to an exemplary embodiment of the present invention.

FIG. 1 is a schematic diagram schematically showing a heat treatment device of a membrane-electrode assembly for a fuel cell according to an exemplary embodiment of the present invention.

Referring to FIG. 1, the heat treatment device 100 of a membrane-electrode assembly for a fuel cell according to an exemplary embodiment of the present invention may be applied to an automation system for automatically and continuously manufacturing components of unit fuel cells configuring a fuel cell stack.

Figure 2:
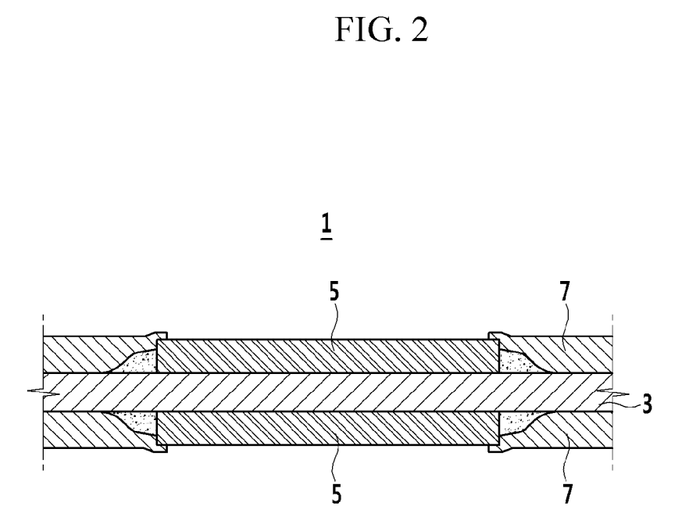
FIG. 2 is a schematic diagram schematically showing a membrane-electrode assembly manufactured by the heat treatment device of a membrane-electrode assembly for a fuel cell according to an exemplary embodiment of the present invention.

In addition, the automation system is arranged to manufacture a membrane-electrode assembly 1 in which electrode catalyst layers 5 are formed on both surfaces of an electrolyte membrane 3, respectively, and sub-gaskets 7 are formed at edges of each of the electrode catalyst layers 5, as shown in FIG. 2.

The automation system may automatically implement the entire manufacturing process of the membrane-electrode assembly 1 adhering a membrane-electrode assembly sheet 101 made in a roll form to cutting the membrane-electrode assembly sheet 101.

For example, the automation system may manufacture an electrode membrane sheet 6 by releasing the electrolyte membrane 3 wound in a roll form, releasing a release film wound in a roll form made by continuously coating the electrode catalyst layers 5, and passing the electrolyte membrane 3 and the release film through a roll press so that the electrode catalyst layers 5 are adhered under high temperature and high pressure on both surfaces of the electrolyte membrane 3.

The automation system may manufacture the membrane-electrode assembly sheet 101 by releasing sub-gaskets 7 rolled in a roll form so as to be positioned on both surfaces of an electrode membrane sheet 6, passing the sub-gaskets through a hot roller so that the sub-gaskets 7 are adhered to edges of the electrode membrane sheet 6.

In addition, the automation system may manufacture the final membrane-electrode assembly 1 by releasing the membrane-electrode assembly sheet 101 wound in a roll form and cutting the membrane-electrode assembly sheet 101 in a unit form including the electrode catalyst layers 5. The heat treatment device 100 of a membrane-electrode assembly for a fuel cell according to an exemplary embodiment of the present invention has a structure in which the membrane-electrode assembly sheet 101 is heat treated by hot pressing the membrane-electrode assembly sheet 101 at a high temperature.

That is, the heat treatment device 100 of the membrane-electrode assembly for a fuel cell according to an exemplary embodiment of the present invention improves performance and durability of the membrane-electrode assembly 1 and secures mass production by improving interfacial adhesion force of the electrolyte membrane 3 and the electrode catalyst layers 5 of the membrane-electrode assembly sheet 101 and preventing separation of border portions between the electrolyte membrane 3 and the electrode layers 5.

The heat treatment device 100 of a membrane-electrode assembly for a fuel cell according to an exemplary embodiment of the present invention may be configured between a process of manufacturing the membrane-electrode assembly sheet 101 in the automation system and a process of cutting the membrane-electrode assembly sheet 101.

In addition, according to an exemplary embodiment of the present invention, there is provided the heat treatment device 100 of a membrane-electrode assembly for a fuel cell capable of preventing contraction and serpentine deformation of the membrane-electrode assembly sheet 101 due to heat in a hot press process. A serpentine deformation means deformation in which the membrane-electrode assembly sheet 101 wrinkles in a waveform pattern in a width direction.

Meanwhile, for example, the membrane-electrode assembly sheet 101 is wound around a sheet unwinder roller 12 in a roll form, released from the sheet unwinder roller 102, supplied to the heat treatment device 100 according to an exemplary embodiment of the present invention, and heat-treated in a hot press manner by the heat treatment device 100, then re-wound around a sheet rewinder roller 103.

Further, in an exemplary embodiment of the present invention, a protective film 104 for protecting the membrane-electrode assembly sheet 101 is supplied to the heat treatment device 100, wherein the protective film 104 is wound around a film unwinder roller 105 in a roll form, released from the film unwinder roller 105, supplied to the heat treatment device 100, and re-wound around a film rewinder roller 106.

As an alternative, the present invention is not limited to the supply of membrane-electrode assembly sheet 101 to the heat treatment device 100 while releasing the membrane-electrode assembly sheet 101 wound in a roll form, but also includes supply of the membrane-electrode assembly sheet 101 to the heat treatment device 100 in a state in which the sheet is unrolled.

As another alternative, the membrane-electrode assembly sheet 101 applied to an exemplary embodiment of the present invention has feeding holes 101a spaced apart at a predetermined interval (pitch) in a length direction at both edges in a length direction.

Figure 3:
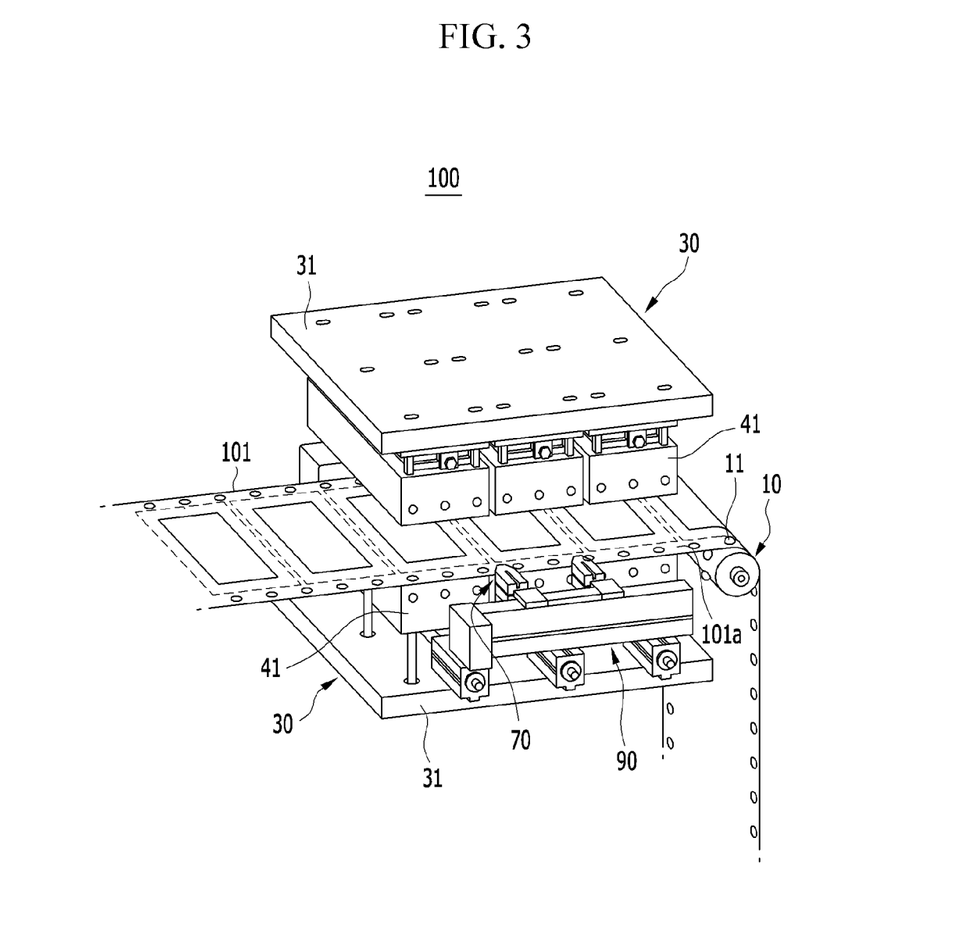
FIG. 3 is a perspective view showing the heat treatment device of a membrane-electrode assembly for a fuel cell according to an exemplary embodiment of the present invention.
Figure 4:
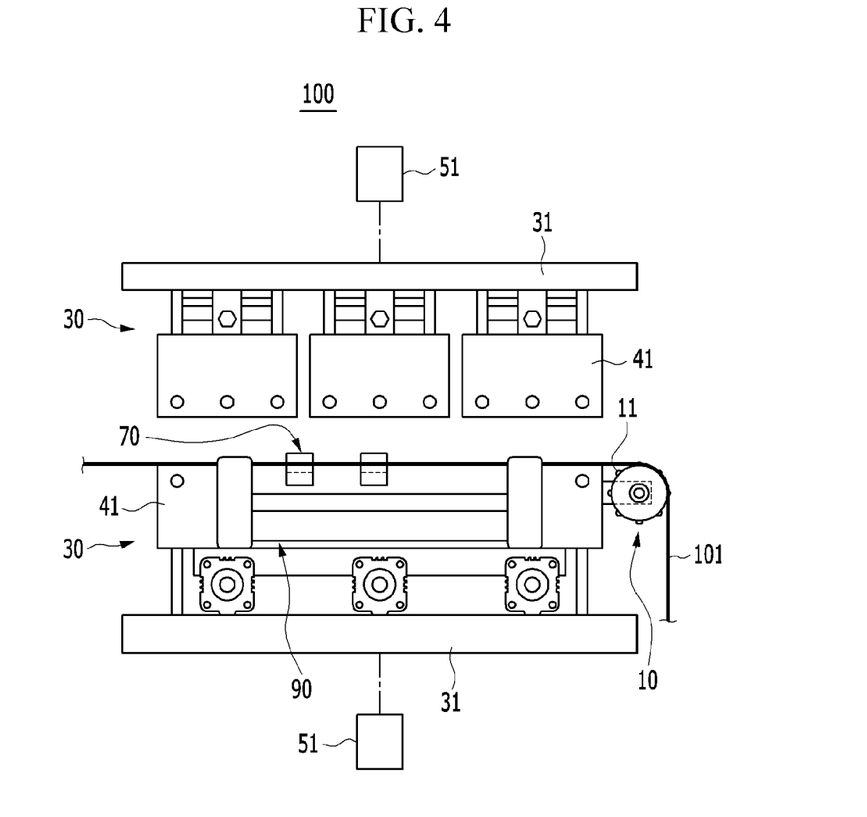
FIG. 4 is a front schematic diagram showing the heat treatment device of a membrane-electrode assembly for a fuel cell according to an exemplary embodiment of the present invention.

FIG. 3 is a perspective view showing the heat treatment device of a membrane-electrode assembly for a fuel cell according to an exemplary embodiment of the present invention, and FIG. 4 is a front schematic diagram showing the heat treatment device of a membrane-electrode assembly for a fuel cell according to an exemplary embodiment of the present invention.

Referring to FIGS. 3 and 4 together with FIG. 1, the heat treatment device of a membrane-electrode assembly for a fuel cell 100 according to an exemplary embodiment of the present invention basically includes a feeding roller 10, hot presses 30, and feeding grippers 70.

Each constituent element is configured in a base frame 201 of the automation system as described above, such that the base frame 201 stands in a vertical direction and supports each constituent element and may be configured in a frame divided into one or two or more portions.

The base frame 201 may include various accessory elements such as a bracket, a bar, a road, a plate, a housing, a case, a block, and the like, supporting the heat treatment device 100.

However, since these various accessory elements are provided for installing constituent elements of the heat treatment device 100 to be described below, in the base frame 201, the accessory elements are collectively termed the base frame 201 excluding exceptional cases.

In an exemplary embodiment of the present invention, the feeding roller 10 is provided to feed the membrane-electrode assembly sheet 101 released from the sheet unwinder roller 102 along a predetermined transport path. Here, the transport path is a path positioned between upper and lower hot presses 30 to be described below.

The feeding roller 10 is a roller inducing the membrane-electrode assembly sheet 101 to the transport path, and is rotatably installed to the lower hot press 30. The feeding roller 10 is rotatably mounted to a side in which the membrane-electrode assembly sheet 101 enters between the upper and lower hot presses 30, which is, for example, rotatably installed in the lower hot press 30.

The feeding roller 10 may feed the membrane-electrode assembly sheet 101 between the upper and lower hot presses 30 while being rotated by the membrane-electrode assembly sheet 101 released from the sheet unwinder roller 102.

The feeding roller 10 is coupled to feeding holes 101a formed in the membrane-electrode assembly sheet 101 through feeding protrusions 11 to be described below, and feeds the membrane-electrode assembly sheet 101 between the upper hot press 30 and the lower hot press 30.

Figure 5:
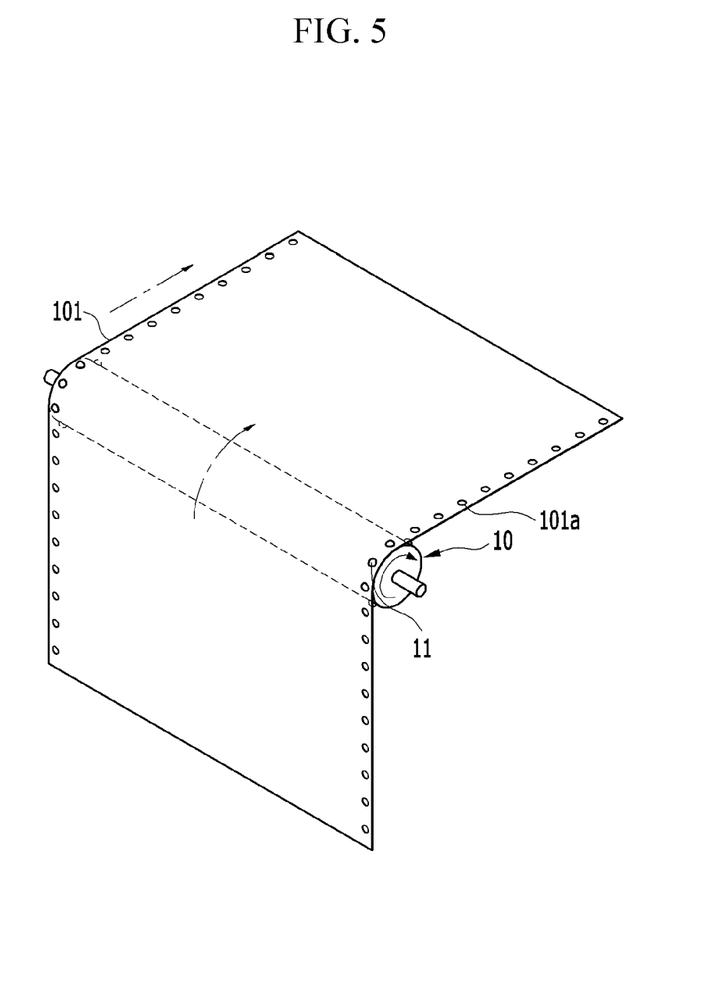
FIG. 5 is a perspective view showing a feeding roller applied to the heat treatment device of a membrane-electrode assembly for a fuel cell according to an exemplary embodiment of the present invention.

Specifically, the feeding roller 10 has feeding protrusions 11 fitted into the feeding holes 101a spaced apart at a predetermined interval at both edge portions of the membrane-electrode assembly sheet 101 in a transportation direction of the membrane-electrode assembly sheet 101, and transports the membrane-electrode assembly sheet 101 along a transportation path as shown in FIG. 5.

The feeding protrusions 11 correspond to the feeding holes 101a of the membrane-electrode assembly sheet 101 and are formed on both outer circumference surfaces of the feeding roller 10. The feeding protrusions 11 are spaced apart from each other in a circumferential direction on the both outer circumference surfaces of the feeding roller 10 at the same pitch as that of the feeding holes 101a of the membrane-electrode assembly sheet 101.

Here, the feeding protrusions 11 are formed into a hemisphere shape in a circumferential direction on both outer circumference surfaces of the feeding roller 10.

Referring to FIGS. 3 and 4 together with FIG. 1, the hot presses 30 in an exemplary embodiment of the present invention press portions of the electrode catalyst layers 5 (shown as dotted line regions in FIG. 1) on upper and lower surfaces of the membrane-electrode assembly sheet 101 transported through the feeding roller 10, at a predetermined temperature.

The hot presses 30 are disposed on upper and lower sides of the transport path of the membrane-electrode assembly sheet 101 transported through the feeding roller 10, respectively, and are installed to be reciprocally moved in a vertical direction relative to the upper and lower surfaces of the membrane-electrode assembly sheet 101.

For example, the hot presses 30 may be configured in a press frame 301 in FIG. 1 provided in the above-described base frame 201. The hot presses 30 at upper and lower sides include moving frames 31 and hot plates 41.

The moving frames 31 are disposed to face each other on the upper and lower surfaces of the membrane-electrode assembly sheet 101 transferred through the feeding roller 10 along the transport path, respectively, and are installed to be reciprocally moved in a vertical direction in the press frame 301.

The hot plate 41 is a plate heated to a predetermined temperature by predetermined heat sources, for example, heating means such as a heat rays, a heater rod, and the like, and heat-presses the portions of the electrode catalyst layers 5 of the upper and lower surfaces of the membrane-electrode assembly sheet 101.

The hot plates 41 are mounted at the moving frames 31 while facing each other on the upper and lower surfaces of the membrane-electrode assembly sheet 101 transferred through the feeding roller 10 along the transport path. The plurality of hot plates 41 are installed on the moving frames 31 with a predetermined interval in the transport direction of the membrane-electrode assembly sheet 101. For example, three hot plates 41 may be installed on the moving frames 31 at upper and lower sides, respectively.

Further, the moving frames 31 are installed to be connected with press cylinders 51 vertically and reciprocally moving toward the upper and lower surfaces of the membrane-electrode assembly sheet 101.

The press cylinders 51 are provided at upper and lower sides of the press frame 301, respectively, and are installed to be connected to the moving frames 31 at the upper and lower sides. The press cylinders 51 may be operated by hydraulic or pneumatic pressure.

Referring to FIGS. 3 and 4 together with FIG. 1, the feeding grippers 70 in an exemplary embodiment of the present invention perform gripping on both edge portions of the membrane-electrode assembly sheet 101 transferred between the upper hot press 30 and the lower hot press 30 through the feeding roller 10.

The feeding grippers 70 perform gripping on both edge portions according to the transport direction of the membrane-electrode assembly sheet 101, that is, a portion except for the portions of the electrode catalyst layers 5 of the upper and lower surfaces of the membrane-electrode assembly sheet 101.

The feeding grippers 70 are provided in one pair, and, for example, are installed to be reciprocally movable in the transport direction of the membrane-electrode assembly sheet 101, at a gripping frame 79 separately from the upper hot press 30 and the lower hot press 30.

That is, the feeding gripper 70 may perform gripping on both edge portions of the membrane-electrode assembly sheet 101, synchronizing with a transport speed of the membrane-electrode assembly sheet 101, and may be moved together with the membrane-electrode assembly sheet 101, when transporting the membrane-electrode assembly sheet 101 between the upper hot press 30 and the lower hot press 30 through the feeding roller 10.

Further, when heat-pressing the membrane-electrode assembly sheet 101 through the upper and lower hot presses 30, the feeding gripper 70 may be moved in a direction opposite that of the transport of the membrane-electrode assembly sheet 101 in a state in which the gripping of the membrane-electrode assembly sheet 101 is released.

Configuration of the feeding gripper 70 as described above will be described below in more detail with reference to FIGS. 7a and 7b.

The gripping frame 79 in an exemplary embodiment of the present invention is provided with a gripper moving unit 90 reciprocally moving the feeding grippers 70 in the transport direction of the membrane-electrode assembly sheet 101.

Figure 6:
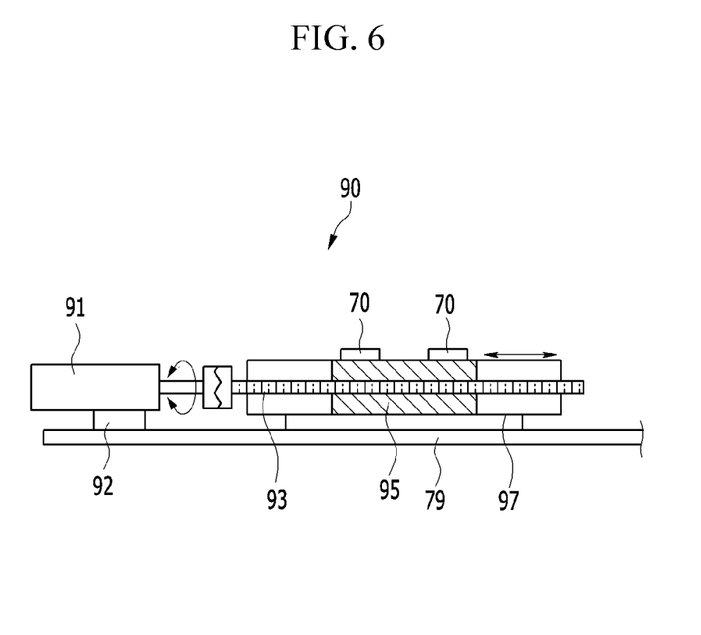
FIG. 6 is a view schematically showing a gripper moving unit applied to the heat treatment device of a membrane-electrode assembly for a fuel cell according to an exemplary embodiment of the present invention.

FIG. 6 is a view schematically showing the gripper moving unit applied to the heat treatment device of a membrane-electrode assembly for a fuel cell according to an exemplary embodiment of the present invention.

Referring to FIG. 6, the gripper moving unit 90 according to the exemplary embodiment includes a servomotor 91, a lead screw 93, a moving block 95, and a guide block 97.

The servomotor 91 is fixed to the gripping frame 79 through a fixing block 92. The lead screw 93 is connected to a drive shaft of the servomotor 91.

The moving block 95 is coupled to the feeding gripper 70 and engaged with the lead screw 93. The guide block 97 is fixed to the gripping frame 79. The guide block 97 is coupled with the moving block 95 to be reciprocally and slidably moved in the transport direction and the direction opposite that of the transport of the membrane-electrode assembly sheet 101.

Accordingly, when rotating the lead screw 93 in a forward direction through the servomotor 91 in an exemplary embodiment of the present invention, the moving block 95 may be slidably moved in the transport direction of the membrane-electrode assembly sheet 101 along the guide block 97.

Further, when rotating the lead screw 93 in a reverse direction through the servomotor 91 in an exemplary embodiment of the present invention, the moving block 95 may be slidably moved in the direction opposite that of the transport of the membrane-electrode assembly sheet 101 along the guide block 97.

Figure 7A:
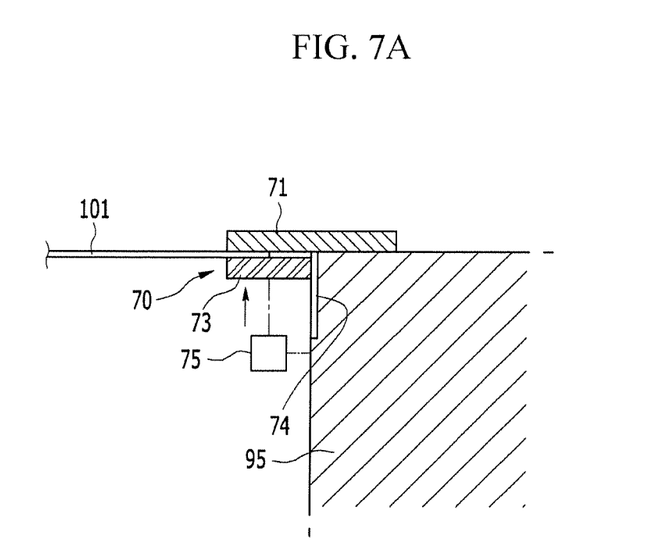
FIGS. 7(a) and 7(b) are a view schematically showing a feeding gripper applied to the heat treatment device of a membrane-electrode assembly for a fuel cell according to an exemplary embodiment of the present invention.
Figure 7B:
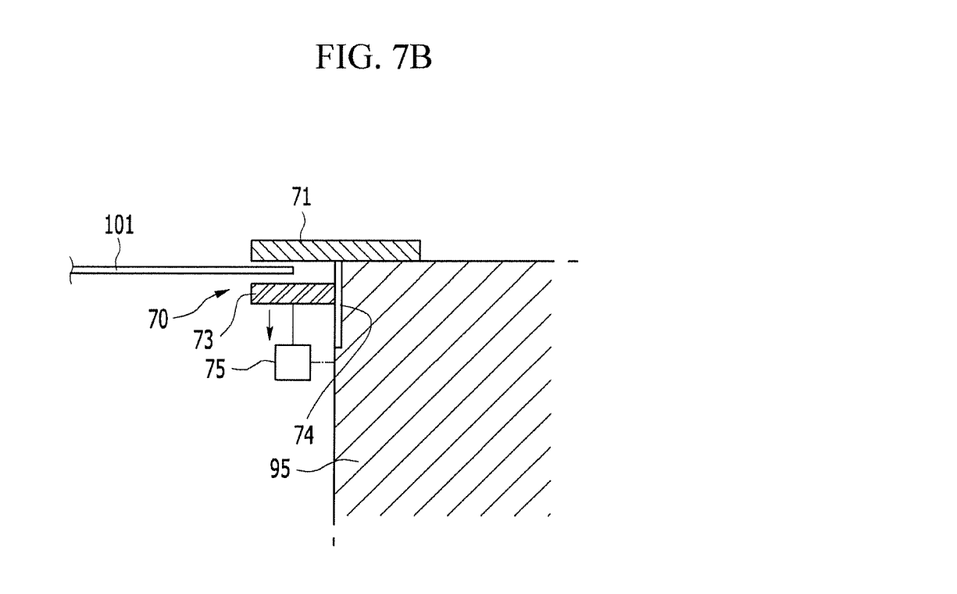

Meanwhile, the feeding gripper 70 may perform gripping on both edge portions of the membrane-electrode assembly sheet 101 or may release gripping of the both edge portions thereof as shown in FIGS. 7(a) and 7(b). To this end, the feeding gripper 70 according to an exemplary embodiment of the present invention includes a fixing gripping bar 71, a movable gripping bar 73, and a gripping cylinder 75.

The fixing gripping bar 71 supports upper surfaces of both edge portions of the membrane-electrode assembly sheet 101, and is installed to be fixed to the moving block 95 of the gripper moving unit 90.

The movable gripping bar 73 supports lower surfaces of both edge portions of the membrane-electrode assembly sheet 101, and is installed to the moving block 95 to be reciprocally movable in a vertical direction, corresponding to that of the fixing gripping bar 71. Here, the fixing gripping bar 71 may be coupled to the moving block 95 to be reciprocally movable in a vertical direction through a guide rail 74.

In addition, the gripping cylinder 75 applies forward and reverse operation force in a direction vertical to that of the movable gripping bar 73, and may be fixed to the moving block 95, and may be operated by hydraulic or pneumatic pressure.

Accordingly, the feeding gripper 70 may perform gripping on both edge portions of the membrane-electrode assembly sheet 101 through the movable gripping bar 73 and the fixing gripping bar 71 while the movable gripping bar 73 is moved in an upper side direction as the gripping cylinder 75 is forward operated (FIG. 7(a)).

Further, the feeding gripper 70 may release the gripping of the both edge portions of the membrane-electrode assembly sheet 101 while the movable gripping bar 73 is moved in a lower side direction as the gripping cylinder 75 is operated in reverse (FIG. 7(b)).

Hereinafter, the operation of the heat treatment device of a membrane-electrode assembly for a fuel cell configured as above according to an exemplary embodiment of the present invention will be described in detail with reference to the above-disclosed drawings and the accompanying drawings.

Figure 8:
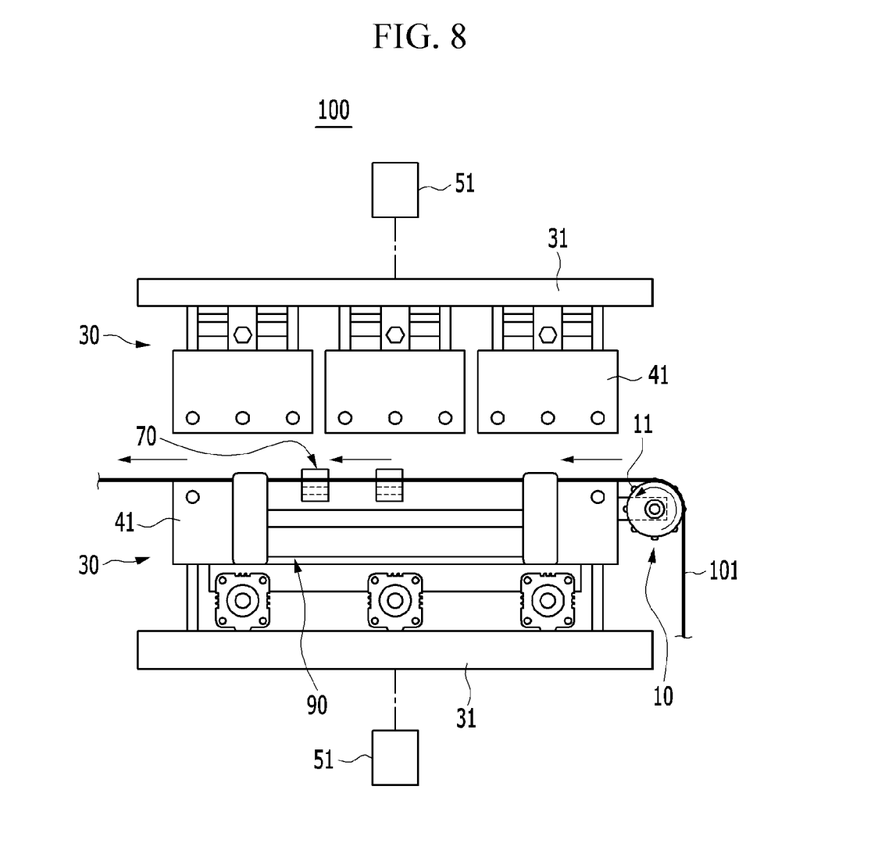
FIGS. 8 to 10 are views showing operation of the heat treatment device of the membrane-electrode assembly for a fuel cell according to an exemplary embodiment of the present invention.
Figure 9:
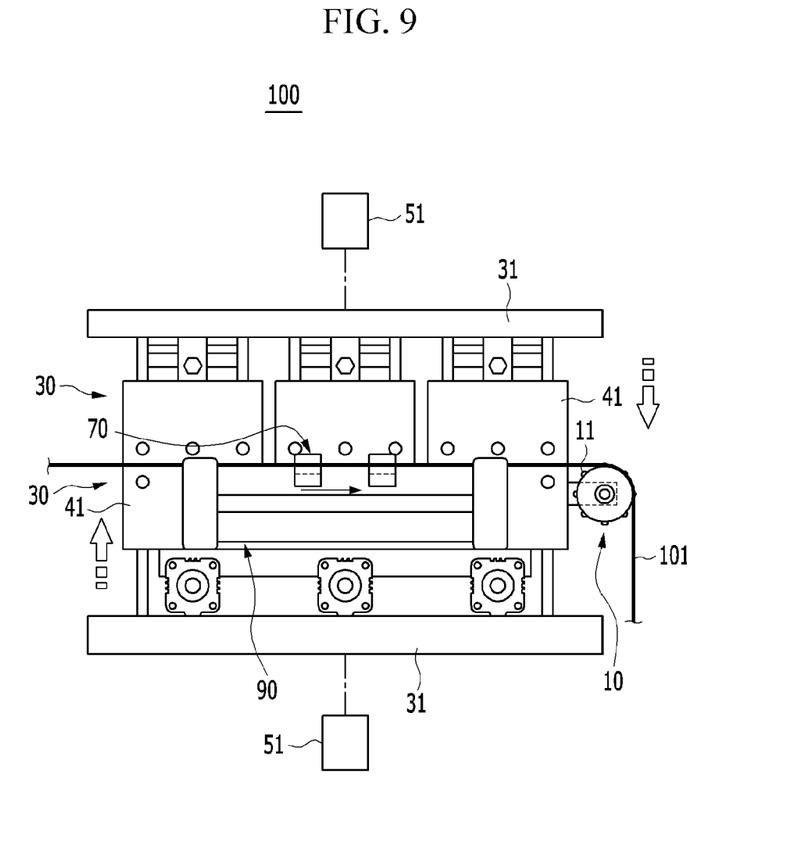
Figure 10:
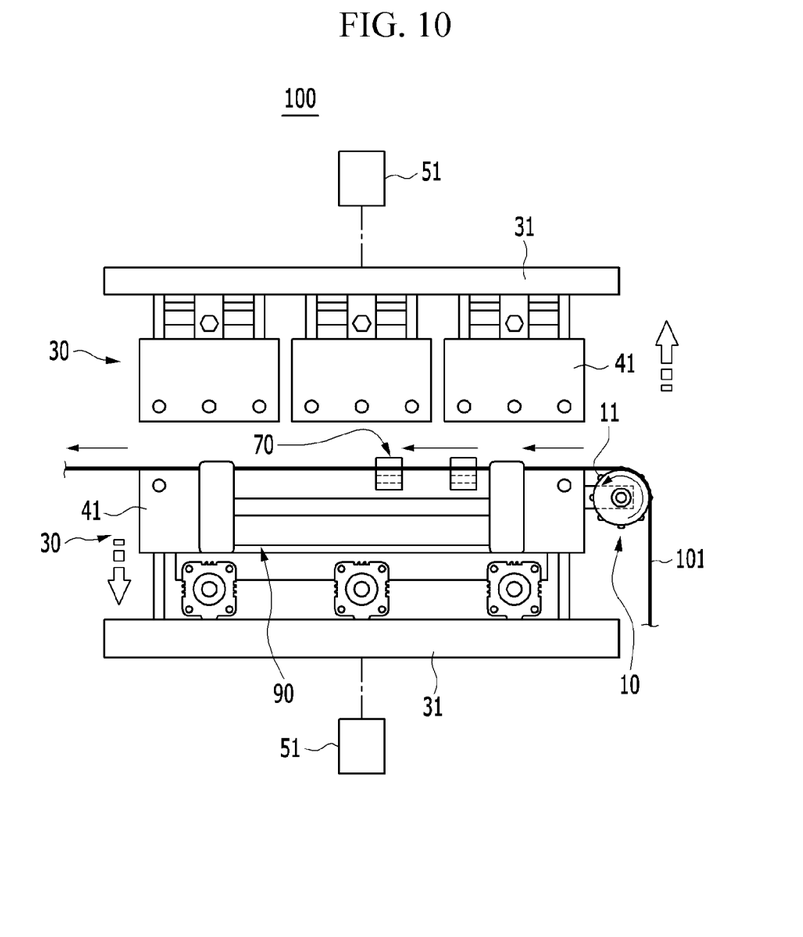

FIGS. 8 to 10 are views showing operation of the heat treatment device of the membrane-electrode assembly for a fuel cell according to an exemplary embodiment of the present invention.

First, referring to FIG. 8, in an exemplary embodiment of the present invention, the membrane-electrode assembly sheet 101 is transported between the upper hot press 30 and the lower hot press 30 by releasing the membrane-electrode assembly sheet 101 wound around the sheet unwinder roller 102 in a roll form.

Here, the upper hot press 30 and the lower hot press 30 have a state of being moved in a direction away from each other (vertical direction) by the press cylinder 51 with the membrane-electrode assembly sheet 101 interposed therebetween. In addition, the hot plates 41 of the hot press 30 have a state of being heated to a predetermined temperature by heat sources.

Meanwhile, the feeding roller 10 feeds the membrane-electrode assembly sheet 101 between the upper and lower hot presses 30 while being rotated by the membrane-electrode assembly sheet 101 released from the sheet unwinder roller 102.

The feeding roller 10 may feed the membrane-electrode assembly sheet 101 between the upper hot press 30 and the lower hot press 30 as the feeding protrusions 11 are fitted into the feeding holes 101a of the membrane-electrode assembly sheet 101.

Accordingly, in an exemplary embodiment of the present invention, feeding the membrane-electrode assembly sheet 101 is capable of being much more accurately controlled through synchronization control of the feeding roller 10 and the membrane-electrode assembly sheet 101.

Further, in an exemplary embodiment of the present invention, the feeding protrusions 11 of the feeding roller 10 are fitted into the feeding holes 101a of the membrane-electrode assembly sheet 101 to support and feed the membrane-electrode assembly sheet 101 in a width direction, thereby preventing serpentine deformation in a width direction of the membrane-electrode assembly sheet 101 due to heat generated from the hot plates 41.

In this process, the feeding grippers 70 according to an exemplary embodiment of the present invention, perform gripping on the both edge portions of the membrane-electrode assembly sheet 101 by the gripping cylinder 75, synchronize the transport speed (a feeding speed) of the membrane-electrode assembly sheet 101 by the gripper moving unit 90 and are moved in the transport direction of the membrane-electrode assembly sheet 101.

The feeding gripper 70 may perform gripping on both edge portions of the membrane-electrode assembly sheet 101 through the movable gripping bar 73 and the fixing gripping bar 71, while the movable gripping bar 73 is moved in an upper side direction as the gripping cylinder 75 is forward operated (FIG. 7(a)).

In addition, in the gripper moving unit 90, when rotating the lead screw 93 in a forward direction through the servomotor 91, the moving block 95 may be slidably moved in the transport direction of the membrane-electrode assembly sheet 101 along the guide block 97, and the feeding gripper 70 may be moved in the transport direction of the membrane-electrode assembly sheet 101.

Therefore, by performing gripping on the both edge portions of the membrane-electrode assembly sheet 101 through the feeding gripper 70 in an exemplary embodiment of the present invention, contraction deformation of the membrane-electrode assembly sheet 101 due to heat generated from the hot plates 41 may be prevented.

When the membrane-electrode assembly sheet 101 enters between the upper and lower hot presses 30 as described above, the hot presses 30 are moved through the press cylinder 51 toward the upper and lower surfaces of the membrane-electrode assembly sheet 101 as shown in FIG. 9 in an exemplary embodiment of the present invention.

Then, the hot plates 41 of the hot presses 30 heat-press the portions of the electrode catalyst layers 5 of the upper and lower surfaces of the membrane-electrode assembly sheet 101.

In this process, the feeding gripper 70 releases the gripping of both edge portions of the membrane-electrode assembly sheet 101 by the gripping cylinder 75 and is moved in a direction opposite that of the transport of the membrane-electrode assembly sheet 101 by the gripper moving unit 90.

Here, the feeding gripper 70 may release the gripping of both edge portions of the membrane-electrode assembly sheet 101 while the movable gripping bar 73 is moved in a lower side direction as the gripping cylinder 75 is operated in reverse (FIG. 7(b)).

In addition, in the gripper moving unit 90, when rotating the lead screw 93 in a reverse direction through the servomotor 91, the moving block 95 may be slidably moved in the direction opposite that of the transport of the membrane-electrode assembly sheet 101 along the guide block 97, and the feeding gripper 70 may be moved in a direction opposite that of the transport of the membrane-electrode assembly sheet 101.

In the state in which the portions of the electrode catalyst layers 5 of the membrane-electrode assembly sheet 101 are heat-pressed through the hot presses 30 as described above, the upper hot press 30 and the lower hot press 30 are moved in a direction away from each other through the press cylinder 51 in an exemplary embodiment of the present invention, as shown in FIG. 10.

Accordingly, in an exemplary embodiment of the present invention, the membrane-electrode assembly sheet 101 may be heat treated through the hot presses 30 by repeating a series of processes as described above.

With the heat treatment device 100 of a membrane-electrode assembly for a fuel cell according to an exemplary embodiment of the present invention as described so far, the membrane-electrode assembly sheet 101 may be heat treated in a hot press manner pressing the membrane-electrode assembly sheet 101 at a high temperature.

Therefore, in an exemplary embodiment of the present invention, performance and durability of the membrane-electrode assembly 1 may be increased and mass production thereof may be secured by improving interfacial adhesion force of the electrolyte membrane 3 and the electrodes layers 5 of the membrane-electrode assembly sheet 101 and preventing separation of border portions between the electrolyte membrane 3 and the electrode catalyst layers 5.

Further, according to an exemplary embodiment of the present invention, since contraction and serpentine deformation of the membrane-electrode assembly sheet 101 due to heat in a hot press process may be prevented through the feeding roller 10 and the feeding gripper 70, product quality and productivity of the membrane-electrode assembly 1 may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A heat treatment device of a membrane-electrode assembly for a fuel cell for heat-treating a membrane-electrode assembly sheet including an electrolyte membrane and electrode catalyst layers continuously adhered onto both surfaces of the electrolyte membrane, the heat treatment device comprising:
    a feeding roller feeding the membrane-electrode assembly sheet along a predetermined transport path; and
    hot presses disposed on upper and lower sides of the transport path, respectively, mounted to be reciprocatingly movable in a vertical direction and heat-pressing portions of the electrode catalyst layers of upper and lower surfaces of the membrane-electrode assembly sheet at a predetermined temperature, wherein the feeding roller being coupled to feeding holes formed in the membrane-electrode assembly sheet through feeding protrusions, and the hot presses include
moving frames disposed to face each other on the upper and lower surfaces of the membrane-electrode assembly sheet, and reciprocatingly movable in a vertical direction, and
a plurality of hot plates installed at the moving frames at a predetermined interval in the transport direction of the membrane-electrode assembly sheet, and pressing portions of the electrode catalyst layer of upper and lower surfaces of the membrane-electrode assembly sheet.

2. The heat treatment device of a membrane-electrode assembly for a fuel cell of claim 1, wherein:
the feeding protrusions protrude at the same pitch as that of the feeding holes at both sides of the feeding roller, and are fitted into the feeding holes, corresponding to the feeding holes spaced apart from each other at a predetermined distance in a transport direction at both edge portions of the membrane-electrode assembly sheet.

3. The heat treatment device of a membrane-electrode assembly for a fuel cell of claim 1, wherein:
the moving frames are mounted to be connected with press cylinders for reciprocatingly moving the moving frames toward the upper and lower surfaces of the membrane-electrode assembly sheet.

4. The heat treatment device of a membrane-electrode assembly for a fuel cell of claim 1, wherein:
the feeding roller is rotatably installed to a side at which the membrane-electrode assembly sheet enters between the upper and lower hot presses.

5. The heat treatment device of a membrane-electrode assembly for a fuel cell of claim 4, wherein:
the feeding protrusions are formed as protrusions into a hemisphere shape on both external circumference surfaces of the feeding roller.

6. A heat treatment device of a membrane-electrode assembly for a fuel cell for heat-treating a membrane-electrode assembly sheet including an electrolyte membrane and electrode catalyst layers continuously adhered onto both surfaces of the electrolyte membrane, the heat treatment device of a membrane-electrode assembly for a fuel cell comprising:
a feeding roller feeding the membrane-electrode assembly sheet along a predetermined transport path;
hot presses disposed on upper and lower sides of the transport path, respectively, installed to be reciprocally movable in a vertical direction and heat-pressing portions of the electrode catalyst layers of upper and lower surfaces of the membrane-electrode assembly sheet at a predetermined temperature;
at least one feeding gripper mounted to a gripping frame to be reciprocally movable in a transport direction of the membrane-electrode assembly sheet and performing gripping on both edge portions in the transport direction of the membrane-electrode assembly sheet, and
a gripper moving unit mounted to the gripping frame so that the feeding grippers are reciprocally moved in the transport direction of the membrane-electrode assembly sheet.

7. The heat treatment device of a membrane-electrode assembly for a fuel cell of claim 6, wherein:
the gripper moving unit includes a servomotor installed in the gripping frame,
a lead screw installed to be connected with the servomotor,
a moving block coupled to the feeding gripper and engaged with the lead screw, and
a guide block installed to be fixed to the gripping frame, and coupled with the moving block to be slidably movable in the transport direction of the membrane-electrode assembly sheet.

8. The heat treatment device of a membrane-electrode assembly for a fuel cell of claim 7, wherein:
the feeding gripper includes
a fixing gripping bar installed to be fixed to the moving block, and
a movable gripping bar installed to the moving block to be reciprocatingly movable in a vertical direction, corresponding to that of the fixing gripping bar.

9. The heat treatment device of a membrane-electrode assembly for a fuel cell of claim 8, wherein:
the moving block is installed with
a gripping cylinder applying forward and reverse operation force in a vertical direction to the movable gripping bar.

10. A heat treatment device of a membrane-electrode assembly for a fuel cell for heat-treating a membrane-electrode assembly sheet including an electrolyte membrane and electrode catalyst layers continuously adhered onto both surfaces of the electrolyte membrane, the heat treatment device of a membrane-electrode assembly for a fuel cell comprising:
a feeding roller feeding the membrane-electrode assembly sheet along a predetermined transport path;
hot presses disposed on upper and lower sides of the transport path, respectively, reciprocatingly movable in a vertical direction and heat-pressing portions of the electrode catalyst layers of upper and lower surfaces of the membrane-electrode assembly sheet at a predetermined temperature; and
at least one feeding gripper mounted to a gripping frame to be reciprocatingly movable in a transport direction of the membrane-electrode assembly sheet and performing gripping on both edge portions in the transport direction of the membrane-electrode assembly sheet,
wherein the feeding roller being coupled to feeding holes formed in the membrane-electrode assembly sheet through feeding protrusions, and
the hot presses include
moving frames disposed to face each other on the upper and lower surfaces of the membrane-electrode assembly sheet, and reciprocatingly movable in a vertical direction, and
a plurality of hot plates installed at the moving frames at a predetermined interval in the transport direction of the membrane-electrode assembly sheet, and pressing portions of the electrode catalyst layer of upper and lower surfaces of the membrane-electrode assembly sheet.

11. The heat treatment device of a membrane-electrode assembly for a fuel cell of claim 10, wherein:
the feeding protrusions protrude at the same pitch as the feeding holes at both sides of the feeding roller, and are fitted into the feeding holes, corresponding to the feeding holes spaced apart from each other at a predetermined distance in a transport direction at both edge portions of the membrane-electrode assembly sheet.

12. The heat treatment device of a membrane-electrode assembly for a fuel cell of claim 10, wherein the moving frames are installed to be connected with press cylinders for reciprocatingly moving the moving frames toward the upper and lower surfaces of the membrane-electrode assembly sheet.

13. The heat treatment device of a membrane-electrode assembly for a fuel cell of claim 12, wherein:
the gripping frame is installed with a gripper moving unit for reciprocally moving the feeding grippers in the transport direction of the membrane-electrode assembly sheet.

14. The heat treatment device of a membrane-electrode assembly for a fuel cell of claim 13, wherein:
the gripper moving unit includes
a servomotor fixed to the gripping frame,
a lead screw installed to be connected with the servomotor,
a moving block coupled to the feeding gripper and engaged with the lead screw, and
a guide block installed to be fixed to the gripping frame, and coupled with the moving block to be slidably movable in the transport direction of the membrane-electrode assembly sheet.

15. The heat treatment device of a membrane-electrode assembly for a fuel cell of claim 14, wherein:
the feeding gripper includes
a fixing gripping bar installed to be fixed to the moving block,
a movable gripping bar installed to the moving block to be reciprocally movable in a vertical direction, corresponding to the fixing gripping bar, and
a gripping cylinder installed in the moving block, and applying forward and reverse operation force in a direction vertical to that of the movable gripping bar.

* * * * *